United States Patent Office 2,967,827
Patented Jan. 10, 1961

2,967,827

METHOD OF RESISTING RADIATION DAMAGE TO ORGANIC FLUIDS AND COMPOSITIONS THEREFOR

Robert O. Bolt, San Rafael, and James G. Carroll, Martinez, Calif., assignors, by mesne assignments, to the United States of America as represented by the United States Atomic Energy Commission No Drawing. Filed June 29, 1956, Ser. No. 595,914

12 Claims. (Cl. 252—28)

The present invention relates in general to conducting operations involving fluid organic substances under circumstances wherein those substances are subjected to nuclear radiation. More particularly the invention relates to an improved method for resisting damage to said fluid organic substances induced by nuclear radiation, and to improved compositions of fluid organic substances which compositions are resistant to deterioration in the presence of nuclear radiation.

The derivation of useful nuclear power will often require the use, in an intensely radioactive environment of a reactor, of compositions of fluid organic compounds for functions dependent primarily on fluidity. Such compositions include especially lubricants as well as power transmission fluids and the like. However, as a general rule, nuclear radiation deleteriously reduces the fluidity of organic compounds, often to the extent of complete solidification in a short time. This is notable in the case of liquid hydrocarbons which include, to a large measure, the variety of liquids normally adapted to serve as efficacious lubricants and other such functional liquids in nonradioactive environments. For example, a representative conventional commercial petroleum hydrocarbon lubricating oil—i.e., paraffinic, solvent-refined Western (United States) automotive oil, SAE–30—upon irradiation for four weeks in a reactor, thickened from its original viscosity range of medium-weight automotive oil to virtually a solid. In such instance the approximate cumulative of radiation dosage sustained amounted to about $1.7 \times 10^{18}$ slow neutrons per square centimeter and a proportionate dosage of gamma radiation and fast neutrons. This represents an exposure which is considered moderate in applications of organic materials around mobile reactors.

As a matter of definition the reactor radiation dosages herein are expressed as slow neutrons per square centimeter. This term is used because slow neutrons are easily measured and not because such neutrons are the most damaging to organic fluids. Indeed, the fast neutrons and gamma components of reactor flux cause more damage than slow neutrons. In graphite-moderated reactors, such as exist at Oak Ridge and Brookhaven National Laboratories, the fast neutron (above about 1 mev. in energy) and gamma (1 mev. average energy) components of radiation flux are present to the extent of about 20% and 50% respectively of the measured slow neutron component. Such slow neutrons are typically measured by the activation of cobalt. More explicitly, in accordance with conventional practice for measuring neutron dosages cobalt or cobalt-aluminum alloy monitors are exposed both alone and covered with a cadmium shield. The subtraction of the activity of the shielded monitor from the activity of the unshielded monitor yields data from which the slow neutron dosages can be calculated. The dosage values used herein were obtained in such a manner.

As indicated above, the loss of fluidity due to nuclear radiation in compositions of fluid organic substances has imposed a serious obstacle to the successful design and utilization of nuclear power plants. This effect tends to necessitate resort to constant disposal and replacement of thickened radiation exposed fluids with a continual supply of fresh fluids so as to sustain the functions of said fluids.

Accordingly, one object of the present invention is to provide a new and improved method for conducting operations utilizing an essentially fluid organic substance under circumstances where the substance is subjected to nuclear radiation causing extensive deterioration of said fluid organic substance.

Another object is to provide improved compositions of fluid organic substances which are useful in radioactive environments without the early replacement heretofore required for such compositions. A further object is to provide improved lubricant compositions which are resistant to damage due to nuclear radiation. A still further object is to provide a "constant viscosity" lubricant composition having a low rate of change in viscosity with exposure to nuclear radiation. Additional objects will become apparent from the following description of the invention.

In accordance with the present invention, the foregoing objects are attained by the use of compositions comprising fluid organic substances in combination with certain styrene polymers. We have discovered that the addition of these styrene polymers to fluid organic substances increases the viscosity and improves the nuclear radiation resistance of the resulting composition. Heretofore it has been proposed to add high molecular weight polymers to lubricating oils to improve the viscosity-temperature relationship of said lubricating oils. Such so-called viscosity index improvers include ester polymers, polyalkenes, polyesters and polystyrene-alkene copolymers. As distinguished from such compounds which improve the V.I. of lubricating oils, the lower alkyl styrene polymers of the present invention do not improve appreciably the V.I. of lubricating oils.

Applicants have discovered that the lower alkyl styrene polymers such as poly (alpha-methyl styrene) effectively thicken various base oils and impart to the mixture nuclear radiation resistance, as measured by viscosity increase, superior to other thickeners. Upon incorporating as little as only a few percent of these oil soluble alkyl styrene polymers into an organic liquid base oil, the degree of radiation-induced viscosity increase resulting from a given dosage of nuclear radiation is markedly reduced, the rate of progressive thickening under a given intensity of continuous nuclear reactor radiation is substantially decreased and inhibited, and otherwise a pronounced relative resistance to nuclear radiation thickening is imparted to the base oil. The particular structure of the styrene polymers with their high percentage of aromatic rings apparently permit a high degree of resonance within the polymer, which property allows the polymer to absorb a great amount of radiation energy without breaking down, i.e., the styrene polymers act as a "sink" for nuclear radiation. The polymer imparts to the mixture resistance to nuclear-radiation-induced damage, as indicated, for example, by change in fluidity, purity of the composition and gas evolution. These effects also occur in the presence of oxidation inhibitors, inhibitors of free radical reactions, metal deactivators and viscosity index improvers, various combinations of which yield preferred embodiments of the invention as described more fully hereinbelow. Furthermore, the presence of the poly (alkyl styrene) in admixture with the base oil does not materially detract from the lubricating efficiency of the base oils to which it is added, and such mixtures of the desired lubricating oil viscosity range even with relatively large proportions of the liquid polymerization products of lower alkyl styrenes yield satisfactory lubricants. Hence, utilizing such mixtures, the present invention provides an improved method for the lubrication of systems being subjected to nuclear radiations normally deleterious to lubricants. Being of such efficiency and having such beneficial attributes, the present method clearly affords substantial practical advantages in the applications of functional fluids in nuclear power plants and the like.

The oil soluble styrene polymers employed in the present invention are polymers of styrene substituted such as in the alpha position with lower alkyl groups, which substitution is believed to decrease the activity of the double bond sufficiently in the manner to produce low molecular weight oil-soluble polymers. Preferably the polymers are liquids such as α-methyl styrene polymer which is miscible with oils including lubricating oil.

Hence, the lower molecular weight alpha-alkyl styrenes with a minimum of aliphatic carbons are the preferred monomers and the polymers of α-methyl styrene are especially preferred. Other substituted styrenes from which polymers may be formed are para-methyl styrene, alpha-methyl-para-methyl styrene, para-isopropyl styrene, unsymmetrical methyl para-tolyl ethylene, unsymmetrical methyl para-cumyl ethylene and the like. Various ways of preparing the monomers and the polymers therefrom are disclosed in ACS Monograph No. 115, entitled "Styrene, Its Polymers, Copolymers and Derivatives," by Boundy and Boyer (Reinhold Pub Corp., 1952), and in U.S. Patent 2,215,569. Suitable liquid α-methyl styrene polymers are obtained from Dow Chemical Co., as "Dow Resins 276–V2 and V9," which have viscosities at 60° C. of 100–200 and 700–1000 cps., respectively; these are believed to be, or contain mostly, higher polymers than dimers which distills at 158–160° C., under 10 mm. Hg pressure, according to U.S. Patent 2,227,808.

The lower alkyl styrene polymers employed are normally those which are sufficiently viscous to thicken substantially the base oil used. Suitable polymers usually have viscosities from 100 cps. to very high viscosities so long as the polymer is miscible with the base oil. From the standpoint of vaporization losses the higher boiling products of polymerizing lower alkyl styrenes which contain only minor amounts of materials of appreciable volatility at operating temperatures are preferred. A 5% boiling point of 300° F. would be a minimum, although preferably the 5% boiling point should be above 500° F. For example, a suitable poly (α-methyl styrene) has a 5% to 90% boiling range of 150–300° C. at 5 mm. Hg. Since the lower alkyl styrene polymerization products do not crystallize upon cooling but rather form glasses, they are superior, from the pour point standpoint in lubricant compositions, to other aromatic materials which crystallize upon cooling.

The lower alkyl styrene polymers are used in sufficient amount at least to thicken substantially the base oil. The mixture of polymer and base oil may contain from 1 to 70% of the polymers, although usually 10 to 40% results in a satisfactory lubricant.

In the mixture of base oil and alkyl styrene polymer, the base oil can be petroleum-derived hydrocarbon fractions of suitable viscosity ranges for the desired service. Representative of the better of these are the commercial, paraffinic, solvent-refined lubricating oils derived from Western (United States) petroleum, and also from Pennsylvania, Middle East, Mid-Continent (United States) and Coastal (United States) petroleum crudes, of the various common viscosities ranging from light turbine oil (e.g., 150 neutral), hydraulic fluids, and including automotive oil (e.g., SAE–30), and on through heavy steam cylinder, gear and chain oils. However, the so-called "synthetic lubricating oils" are generally preferred in view of their usually superior response to improvement by additives for oxidation inhibition and radiation resistance. These include the alkyl aromatics, organic esters and diesters and polyesters, which have viscosities within much the same ranges as the foregoing petroleum hydrocarbon liquids and also preferably have 5% boiling points above 500° F. The alkyl aromatics are exemplified by technical mixtures of alkylbenzenes of molecular weights approximately of the order of 250 to 400, derived as by-product high-molecular-weight bottoms in detergent alkylbenzene manufacture.

Also practically applicable are various liquid individual organic hydrocarbon compounds, especially long-chain paraffins and long-chain-paraffin-substituted aromatics, typified by octadecylbenzene:

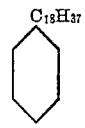

which approximates the viscosity of textile spindle oil, amylbiphenyl, also approximating the viscosity of textile spindle oil, hexadecane (i.e., cetane), which approximates the consistency of light instrument oil, and polyamylnaphthalenes. Among the esters, different species affording appropriate viscosity, heat resistance qualities, and the like, and thus adapted to functional service, are likewise varied. Prominent, though, are those derived from dicarboxylic acids both aromatic and aliphatic, in conjunction with aliphatic, or, better, straight-chain saturated aliphatic, alcohols, and especially from those acids and alcohols of such types respectively comprising from about six to twelve carbon atoms in their molecules. Such compounds provide a liberal assortment of different viscosities and other functional properties; representative of these are: di(2-ethyl hexyl) sebacate, i.e.,

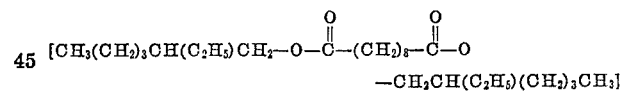

approximating the consistency of light turbine oil and instrument oil; didecyl terephthalate, i.e.,

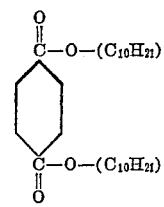

approximating the consistency of automotive oil; and di(2-ethyl-hexyl) ortho phthalate.

Since the alkylbenzenes and organic esters are not commercially available generally in all lubricating oil viscosities, the polymerization products of lower alkyl styrene are especially desirable from a practical standpoint for use in combination with the lower viscosity alkylbenzenes and organic esters. As examples of this particular aspect of the invention, poly (α-methylstyrene) may be combined in a ratio of 30 parts to 70 parts of an alkyl benzene mixture with a viscosity of a furnace oil to produce a material with a viscosity in the SAE 10W crankcase oil range. Similarly poly (α-methylstyrene) may be combined in the ratio of 35 parts to 65 parts of di-2-ethylhexyl sebacate, which has a viscosity of a light hydraulic oil, to produce a lubricant of an SAE 10W crankcase oil viscosity.

While the presence of the lower alkylstyrene polymers in admixture with the base oil results in a substantial reduction in the tendency of the oil composition to increase in viscosity upon exposure to nuclear radiation, the viscosity of the mixture increases upon continued exposure to nuclear radiation. As indicated hereinabove, a special aspect of the present invention is concerned with the use of a third component to effect a further improvement in the resistance of the composition to viscosity change from exposure to nuclear radiation. For this purpose, there is added to the mixture of alkylstyrene polymer and base oil, which mixture tends to increase in viscosity with exposure to nuclear radiation, a minor amount of a polymeric material which tends to decrease in viscosity with exposure to nuclear radiation. Compositions of substantially constant viscosity in radioactive atmosphere are obtained by the addition of such polymeric material in an amount sufficient to offset substantially the thickening effect due to the viscosity increase of the mixture of base oil and lower alkylstyrene polymer. Where the two effects do not exactly compensate each other, the two effects are compensating in a substantial amount and hence the composition is improved with respect to viscosity changes due to radiation effects. The radiation-induced viscosity-decreasing polymeric materials are usually viscosity index improvers and hence the viscosity-temperature characteristics of the resulting composition are likewise improved materially. Moreover applicants have further discovered that the incorporation of such polymeric material, depending upon the amount and nature thereof, can result in actual progressive decrease in viscosity of the composition upon irradiation. Such progressive decrease in viscosity or substantial constancy of viscosity obtains immediately upon initiation of irradation and continues for a considerable period of irradiation, but upon protraction of the irradiation and proceeding to greater cumulative radiation dosages, the viscosity will ultimately commence to increase at about the same rate per unit dosage as with no radiation-induced viscosity-decreasing polymeric material present. For many functional services, the desired duration of usefulness of the oil composition will not extend beyond the period of decreased or constant viscosity. Thus, the resulting compositions are radiation resistant and in the proper viscosity range are useful as lubricants, insulating oils, hydraulic fluids, gear lubricants, dash pot oils, scientific instrument lubricants, shock absorber oils and the like which exhibit relatively little change in viscosity with exposure to nuclear radiation.

The polymeric materials exhibiting the tendency to decrease in viscosity upon irradiation include the following viscosity-improving-polymers: polymerized acrylate esters such as the polymer of alkyl methacrylate, e.g., didodecyl methacrylate (as disclosed more fully in application Serial No. 380,146, filed September 8, 1953, now abandoned, for a Method of Inhibiting Irradiation-Induced Viscosity Increase or Organic Fluids, in the names of F. A. Christiansen, R. O. Bolt, J. W. Kent and G. H. Denison); examples of other suitable acrylate ester polymers are the oil-soluble polymers of isobutyl acrylate, octyl acrylate, cetyl acrylate, amyl methacrylate, n- and iso-hexyl methacrylates, and the like, and the oil-soluble copolymers of two or more of such acrylates and methacrylates. Likewise suitable are the copolymers of styrene and olefins, e.g., isobutylene, such as referred to at page 874 et. seq. of ACS Monograph No. 115, "Styrene, Its Polymers, Copolymers and Derivatives," by Boundy and Boyer (Reinhold Publ. Corp., 1952), or as referred to in U.S. Patent 2,421,082, or as marketed by Monsanto Chemical Corp., under the trade name "Santodex." Also, the higher molecular weight oil-soluble liquid polymers of olefins, e.g., propylene or butylene, but preferably isoolefins, e.g., polyisobutylene, such as marketed by Enjay Corporation as "Paratone," may be employed. Also suitable are the oil-soluble polymerized vinyl ethers such as the vinyl ether resin marketed by Union Carbide and Carbon Corporation as described as Ucon EXFD.

The radiation-induced viscosity-decreasing polymeric material is, as indicated above, employed in small amounts generally ranging from about 2–3% up to about 15–20%.

Instead of the above viscosity improving polymeric materials, polyethers may be incorporated as all or part of the radiation-induced viscosity-decreasing component of the composition. In some instances the polyethers may desirably replace all or part of the base oil component in the mixture of base oil and lower alkyl styrene polymer. The polyether liquids suitable for service in radioactive atmosphere include fluids containing at least 3 ether linkages in the molecule. The polyether molecule preferably contains a multiplicity of ether linkages spaced between short, saturated and straight or branched chain aliphatic radicals. Furthermore, the fluid employed should have a viscosity appropriate, in combination with the other components, for the particular service for which the composition is to be used. The most suitable polyethers will have molecular weights ranging from about 400 to 3000 or above. As examples may be mentioned polymers of propene oxides, e.g., 1,2-propene oxide, wherein the polymerization may be initiated with aliphatic or aryl monohydric alcohols or esters, and the remaining terminal hydroxy groups of the polymer may be esterified or etherified. Suitable polyethers are further described in application Serial No. 380,145, filed September 8, 1953, for a Method of Resisting Irradiation-Induced Viscosity Increase of Organic Fluids, in the names of G. H. Denison, F. A. Christiansen, R. O. Bolt and J. W. Kent. A further advantages of the polyethers is that nuclear radiation enhances the antiwear, antiseizure and general lubricity qualities of the polyethers.

The radiation damage can usually be further improved by blanketing the oil compositions with inert gases such as nitrogen, helium and the like. In such instance where oxygen is excluded, a still further improvement in resistance to radiation damage can sometimes be obtained by employing the branched chain species rather than the straight chain alkyl groups, where they appear in the materials referred to above.

The presence of other additives incorporated in the mixture of base oil and lower alkyl styrene polymer, with or without viscosity index improvers, are normally unobjectionable, unless they adversely react with components of the mixture or are themselves undesirable in a nuclear radiation environment. These additives, in their own various specific manners, enhance the value of the compositions and consequently tend to complement the lower alkyl styrene polymers in improving the overall efficiency of the resulting compounded oil. For example, it may sometimes be desirable to incorporate in the oil composition small amounts of antioxidants, of which are preferred the organo selenides such as the dialkyl and diaryl monoselenides (as disclosed in application Serial No. 380,144, filed September 8, 1953, in the names of F. A. Christiansen, J. W. Kent, R. O. Bolt and G. H. Denison, for a Method of Inhibiting Radiation Damage to Organic Fluids. Especially in the presence of metals, e.g., iron, copper or silver, the oil composition will preferably contain small amounts of metal deactivators such as alizarin, quinizarin or other dihydroxy anthraquinones and thiazoles such as mercaptobenzothiazole, to aid in inhibiting the adverse thickening of the oil composition in services involving exposure to nuclear radiation. Sometimes also desirable are inhibitors of free radical reactions (i.e., scavengers for free radicals), which inhibitors are preferably iodo-substituted aromatic compounds such as iodobenzene, iodonaphthalene, iodobiphenyl and like compounds, as disclosed in application Serial No. 380,147, filed September 8, 1953, in the names of R. O. Bolt, J. G. Carroll, J. W. Kent, F. A. Christiansen and G. H. Denison, for a Method of Inhibiting Irradiation Induced Viscosity Increase of Organic Fluids.

These secondary additives, namely, the oxidation inhibitors, metal deactivators and free radical scavengers are generally employed in small amounts such as 0.005–1% to 5–10%, by weight of the oil composition.

In the following examples, the viscosity change is employed as the primary criterion of determination. The index of damage, $\eta_1$ (or $\eta_{10}$), is defined as the viscosity of an irradiated fluid at the temperature, $T_1$ (or $T_{10}$), at which the viscosity of the starting material was one centistoke (cs.) (or 10 cs.). This index provides a common comparative basis for fluids of widely differing viscosities. By this means the initial viscosity of each fluid begins at one cs.; and viscosity change can be measured in terms of deviation from this common point.

The following examples further illustrate the compositions and methods of the present invention:

EXAMPLE I

A series of fluids of lubricating oil viscosity were prepared with the additives of the present invention and also other additives for comparison, as shown in Table I. The base oil (denoted here as "A" to distinguish from other base oils in other examples) was composed of mixed alkylbenzenes with an average molecular weight of about 250 and were mainly monoalkylbenzenes, wherein the alkyl group was derived from propene polymers. In the alkylbenzene base oil was included 5% dodecyl selenide and about 0.1% quinizarin. The poly ($\alpha$-methyl styrene) employed was obtained as Dow Resins 276–V9 from Dow Chemical Co., and had a viscosity at 60° C. of 700–1000 cps., and a 5% to 90% boiling range of 150–300° C. at 5 mm. Hg. The poly (lauryl methacrylate) employed was an alkyl methacrylate polymer obtained as Acryloid HF–855 from Rohm and Haas Co., the highly refined gas oil carrier being removed before use and a 30% solution of the polymer in toluene having a viscosity of 55 cs. at 20° C. The polybutene had a 210° F. viscosity of 120,000 cs. The styrene-olefin copolymer is derived from styrene and olefins of 8–12 carbon atoms and had viscosities of 12,000 S.S.U. at 100° F. and 1410 at 210° F., a gravity of 26.6° API and a flash point of 350° F. Samples of the fluids made up of the base oil plus the indicated amounts of the additives were placed in 1020 steel containers, open to the air, and exposed at 25° C. to various dosages of $Co^{60}$ gamma rays from a 600-curie source of the Brookhaven tube type (see Nucleonics, vol. 9, pp. 10–13 [1950]), which gives a flux of $1.69 \times 10^5$ r./hr. or $4.06 \times 10^6$ r./day. The amounts (in percent by weight of the composition) of the several additives and the results of the irradiation are shown in the following Table I:

Table I

| Test No. | Additive | Amount, percent | Exposure | | Viscosity (Centistokes) | | Index of Damage | |
|---|---|---|---|---|---|---|---|---|
| | | | Days | R×10⁵ | at 100° F. | at 210° F. | $T_{10}$ | $\eta_{10}$ |
| 1 | Poly ($\alpha$-methylstyrene) | 30 | 0 | 0 | 19.6 | 2.98 | 129 | 10.0 |
| 2 | do | 30 | 9.19 | 0.37 | 19.8 | 3.17 | 129 | 10.3 |
| 3 | do | 30 | 21.25 | 0.86 | 20.0 | 3.19 | 129 | 10.4 |
| 4 | do | 30 | 22.33 | 0.90 | 20.1 | 3.19 | 129 | 10.5 |
| 5 | do | 30 | 30.99 | 1.26 | 20.3 | 3.21 | 129 | 10.6 |
| 6 | do | 30 | 76.46 | 3.10 | 20.9 | 3.27 | 129 | 11 |
| 7 | do | 30 | 89.07 | 3.61 | 21.0 | 3.28 | 129 | 11 |
| 8 | do | 30 | 98.26 | 3.98 | 21.3 | 3.30 | 129 | 11.2 |
| 9 | Poly (lauryl methacrylate) | 4 | 0 | 0 | 17.3 | 4.35 | 135 | 10.0 |
| 10 | do | 4 | 9.19 | 0.37 | 12.2 | 3.06 | 135 | 7.0 |
| 11 | do | 4 | 21.25 | 0.86 | 11.1 | 2.74 | 135 | 6.3 |
| 12 | do | 4 | 21.80 | 0.88 | 10.6 | 2.65 | 135 | 6.0 |
| 13 | do | 4 | 30.99 | 1.26 | 10.1 | 2.51 | 135 | 5.8 |
| 14 | do | 4 | 52.24 | 2.12 | 9.98 | 2.46 | 135 | 5.7 |
| 15 | do | 4 | 76.46 | 3.10 | 9.81 | 2.39 | 135 | 5.5 |
| 16 | do | 4 | 89.07 | 3.61 | 9.81 | 2.38 | 135 | 5.5 |
| 17 | do | 4 | 98.26 | 3.98 | 9.94 | 2.39 | 135 | 5.6 |
| 18 | Polybutene | 8 | 0 | 0 | 16.5 | 3.86 | 130 | 10.0 |
| 19 | do | 8 | 9.19 | 0.37 | 15.5 | 3.42 | 130 | 9.1 |
| 20 | do | 8 | 21.25 | 0.86 | 14.4 | 3.20 | 130 | 8.4 |
| 21 | do | 8 | 30.99 | 1.26 | 14.0 | 3.11 | 130 | 8.2 |
| 22 | do | 8 | 76.46 | 3.10 | 13.2 | 2.90 | 130 | 7.7 |
| 23 | do | 8 | 98.26 | 3.98 | 13.0 | 2.86 | 130 | 7.5 |
| 24 | Styrene-Olefin Copolymer | 8 | 0 | 0 | 18.6 | 4.27 | 137 | 10.0 |
| 25 | do | 8 | 9.19 | 0.37 | 17.4 | 4.25 | 137 | 9.7 |
| 26 | do | 8 | 21.25 | 0.86 | 15.9 | 3.84 | 137 | 8.8 |
| 27 | do | 8 | 30.99 | 1.26 | 15.3 | 3.69 | 137 | 8.5 |
| 28 | do | 8 | 76.46 | 3.10 | 13.4 | 3.17 | 137 | 7.3 |
| 29 | do | 8 | 98.26 | 3.98 | 13.0 | 3.07 | 137 | 7.1 |

EXAMPLE II

Another series of fluids with various base oils and additives were placed in Pyrex vessels, open to the air, and exposed at 25° C. to the same source and flux as in Example I. Base oil B was composed of mixed alkylbenzenes of an average molecular weight of 250 and were mainly monoalkyl benzenes wherein the alkyl group was derived from propene polymer. Base oil C was a poly (propene oxide) of about 1000 molecular weight and having phenyl and methyl ether groups at the ends of the propene oxide polymer chain, the polymer oil had viscosities of 62.5 and 10.7 at 100° F. and 210° F., respectively. Base oil D was di(2-ethylhexyl) sebacate. Each of these base oils B, C and D contained 5% didodecyl selenide plus 0.05% quinizarin. Base oil E was the same as base oil C except that dibenzyl selenide was substituted for the didodecyl selenide. The additives were the same as described in Example I. The results of the irradiations are given in the following Table II.

Table II

| Test No. | Base Oil | Additive | Amt., percent | Exposure | | Viscosity (Centistokes) | | Index of Damage | |
|---|---|---|---|---|---|---|---|---|---|
| | | | | Days | R×10³ | at 100° F. | at 210° F. | $T_{10}$,° F. | $\eta_{10}$ |
| 30 | B | Poly (α-methylstyrene) / Styrene-Olefin copolymer | 30 / 3.5 | 0 | 0 | 27.4 | 4.4 | 150 | 10.0 |
| 31 | B | Poly (α-methylstyrene) / Styrene-Olefin copolymer | 30 / 3.5 | 11.02 | 0.45 | 26.5 | 4.29 | 150 | 9.7 |
| 32 | B | Poly (α-methylstyrene) / Styrene-Olefin copolymer | 30 / 3.5 | 40.92 | 1.66 | 24.8 | 4.01 | 150 | 9.0 |
| 33 | B | Poly (α-methylstyrene) / Styrene-Olefin copolymer | 30 / 3.5 | 68.61 | 2.78 | 23.8 | 3.93 | 150 | 8.8 |
| 34 | B | Poly (α-methylstyrene) / Styrene-Olefin copolymer | 30 / 3.5 | 108.36 | 4.40 | 23.9 | 3.84 | 150 | 8.7 |
| 35 | B | Poly (α-methylstyrene) / Styrene-Olefin copolymer | 30 / 3.5 | 139.10 | 5.65 | 24.0 | 3.90 | 150 | 8.8 |
| 36 | C | Poly (α-methylstyrene) | 30 | 0 | 0 | 95.1 | 11.5 | 221 | 10.0 |
| 37 | C | ...do... | 30 | 11.02 | 0.45 | 95.7 | 11.2 | 221 | 9.9 |
| 38 | C | ...do... | 30 | 40.96 | 1.66 | 98.3 | 11.1 | 221 | 9.8 |
| 39 | C | ...do... | 30 | 68.61 | 2.78 | 98.6 | 10.9 | 221 | 9.5 |
| 40 | C | ...do... | 30 | 108.36 | 4.40 | 109 | 11.2 | 221 | 10.0 |
| 41 | C | ...do... | 30 | 139.10 | 5.65 | 115 | 11.5 | 221 | 10.0 |
| 42 | E | Poly (lauryl methacrylate) | 2 | 0 | 0 | 59.0 | 11.9 | 227 | 10.0 |
| 43 | E | ...do... | 2 | 11.02 | 0.45 | 54.7 | 9.74 | 227 | 8.2 |
| 44 | E | ...do... | 2 | 20.98 | 0.85 | 54.2 | 9.51 | 227 | 8.0 |
| 45 | E | ...do... | 2 | 40.76 | 1.66 | 53.8 | 9.43 | 227 | 7.8 |
| 46 | E | ...do... | 2 | 61.73 | 2.53 | 53.5 | 9.19 | 227 | 7.7 |
| 47 | E | ...do... | 2 | 108.36 | 4.40 | 61.0 | 8.94 | 227 | 7.4 |
| 48 | D | None | | 0 | 0 | 12.5 | 3.31 | 114 | 10.0 |
| 49 | D | ...do... | | 20.98 | 0.85 | 13.5 | 3.49 | 114 | 10.7 |
| 50 | D | ...do... | | 40.96 | 1.66 | 15.1 | 3.74 | 114 | 12.0 |
| 51 | D | ...do... | | 68.61 | 2.78 | 16.4 | 3.97 | 114 | 13.0 |
| 52 | D | Poly (α-methylstyrene) / Styrene-olefin copolymer | 30 / 3.5 | 0 | 0 | 36.2 | 6.23 | 172 | 10.0 |
| 53 | D | Poly (α-methylstyrene) / Styrene-olefin copolymer | 30 / 3.5 | 11.0 | 0.45 | 35.4 | 6.08 | 172 | 9.8 |
| 54 | D | Poly (α-methylstyrene) / Styrene-olefin copolymer | 30 / 3.5 | 40.96 | 1.66 | 35.6 | 5.93 | 172 | 9.6 |
| 55 | D | Poly (α-methylstyrene) / Styrene-olefin copolymer | 30 / 3.5 | 68.61 | 2.78 | 35.6 | 5.91 | 172 | 9.6 |
| 56 | D | Poly (α-methylstyrene) / Styrene-olefin copolymer | 30 / 3.5 | 108.36 | 4.40 | 37.4 | 6.14 | 172 | 10.0 |
| 57 | D | Styrene-olefin copolymer | 2 | 0 | 0 | 15.3 | 3.96 | 127 | 10.0 |
| 58 | D | ...do... | 2 | 11.02 | 0.45 | 15.4 | 3.96 | 127 | 10.0 |
| 59 | D | ...do... | 2 | 40.96 | 1.66 | 17.3 | 4.19 | 127 | 11.2 |
| 60 | D | ...do... | 2 | 68.61 | 2.78 | 18.4 | 4.40 | 127 | 11.5 |
| 61 | D | ...do... | 2 | 108.36 | 4.40 | 22.1 | 4.84 | 127 | 13.4 |
| 62 | D | ...do... | 2 | 139.10 | 5.65 | 27.7 | 7.13 | 127 | 18.8 |
| 63 | D | Polybutene | 2 | 0 | 0 | 22.7 | 5.88 | 158 | 10.0 |
| 64 | D | ...do... | 2 | 11.02 | 0.45 | 15.7 | 3.95 | 158 | 6.8 |
| 65 | D | ...do... | 2 | 20.98 | 0.85 | 15.7 | 3.93 | 158 | 6.7 |
| 66 | D | ...do... | 2 | 40.76 | 1.66 | 16.9 | 4.01 | 158 | 7.0 |
| 67 | D | ...do... | 2 | 61.73 | 2.53 | 17.8 | 4.22 | 158 | 7.2 |
| 68 | D | ...do... | 2 | 108.36 | 4.40 | 23.1 | 4.99 | 158 | 9.0 |
| 69 | D | ...do... | 2 | 139.10 | 5.65 | 31.2 | 7.67 | 158 | 13.5 |
| 70 | D | Poly (α-methylstyrene) | 30 | 0 | 0 | 25.6 | 4.57 | 150 | 10.0 |
| 71 | D | ...do... | 30 | 48.91 | 1.99 | 26.6 | 4.69 | 150 | 10.3 |
| 72 | D | ...do... | 30 | 79.65 | 3.24 | 29.8 | 5.07 | 150 | 11.4 |

EXAMPLE III

Various fluids thickened to differing consistencies with polybutene were made up and tested as indicated in the following Table III. Therein the poly (α-methylstyrene) and polybutene are as described in more detail in Example I, except that the polybutene used in test No. 80 had a 210° F. viscosity of 18,000 centistokes. Base oil A was the same as used in Example I. Base oil F is an alkyl benzene mixture of an average molecular weight of about 330–340 and consisting largely of dialkyl benzenes with the para isomer predominating (as derived as by product high molecular weight bottoms in detergent alkylbenzene manufacture from alkylation of benzene with propene polymer). Both the base oils A and F contained 5% didodecyl selenide and 0.50 quinizarin, except that in the composition for test No. 74 the amount of didodecyl selenide was 4.95% and in the composition for test No. 79 there was also 5% of a pinene-$P_2S_5$ reaction product, obtained as "Santolube 394C" from Monsanto Chemical Corporation.

Table III

| | Test Nos. | | | | | | | |
|---|---|---|---|---|---|---|---|---|
| | 73 | 74 | 75 | 76 | 77 | 78 | 79 | 80 |
| Base Fluid A | 74.65 | 66.20 | 50.95 | | | | | |
| Base Fluid F | | | | 68.95 | 55.95 | 43.95 | 42.95 | 27.95 |
| Poly (α-methylstyrene) | 15.00 | 21.80 | 33.0 | 18.00 | 32.00 | 40.00 | 35.00 | 49.00 |
| Polybutene | 5.50 | 7.00 | 11.0 | 8.00 | 7.00 | 11.00 | 12.00 | 18.00 |
| Viscosities (cs.): | | | | | | | | |
| at 100° F. | 17.0 | 25.83 | 71.63 | 108.4 | 168.4 | 367.1 | 332.6 | 1,264.0 |
| at 210° F. | 3.44 | 4.42 | 8.09 | 9.35 | 10.88 | 16.88 | 17.31 | 37.7 |

EXAMPLE IV

Some of the test oils from Example III, identified as test oil III-74, etc., and others as indicated below were placed in cans having a polyethylene check valve in the top and exposed to radiation from a source having an average gamma energy of about 1 mev. and consisting of a surrounding array of discharged enriched uranium fuel elements from a canal gamma reactor. The viscosities at 100° F. and 210° F. were measured before radiation and after varying radiation exposures. Test oil IV-81 was composed of 67.2% of the 250 molecular weight alkylbenzene mixture of base oil A, 21.8% of the poly (α-methylstyrene) described in Example I, 5.98% of the styrene-olefin copolymer described in Example I, 4.97% of didodecyl selenide and 0.05% quinizarin. Test oil IV-83 was composed of 45.95% of the 330–340 alkylbenzene mixture of base oil F, 40% of the same poly (α-methylstyrene), 9% of the styrene-olefin copolymer, compositions, their viscosities and results of four-ball wear tests are given in following Table V. The wear test is carried out by rotating a one-half inch steel ball at 775 r.p.m. for 30 minutes against three stationary balls (steel or bronze as indicated) which are covered with the test lubricant. A load of 10 or 20 (as indicated) kilograms is applied vertically during the test. The wear scar areas formed on the three stationary balls are measured at the end of the test.

*Table V*

| | Test Nos. | | | | | | | | |
|---|---|---|---|---|---|---|---|---|---|
| | 88 | 89 | 90 | 91 | 92 | 93 | 94 | 95 | 96 |
| Composition (percent by wt.): | | | | | | | | | |
| Base Oil A | 76.45 | 51.95 | | | | | | | |
| Base Oil F | | | 54.45 | 44.95 | 41.45 | | 27.95 | 32.95 | 48.95 |
| Base Oil G | | | | | | 54.45 | | | |
| Petroleum Bright Stock | | | | | 10 | | | | |
| Poly (α-Me styrene) | 15 | 33 | 32 | 35 | 32 | 33 | 49 | 51 | 30 |
| Styrene-Olefin Copolymer | 3.5 | 10 | 8.5 | 15 | 11.5 | 7.5 | 18 | 11 | 8 |
| Vinyl ether resin | | | | | | | | | 13 |
| Viscosity (SSU): | | | | | | | | | |
| 100° F | 78.0 | 291 | 767 | 1,394 | 1,402 | 1,570 | 3,257 | 3,860 | 6,536 |
| 130° F | 55.0 | 148 | 298 | 529 | 504 | 517 | 1,065 | 1,080 | 2,180 |
| 210° F | 37.5 | 56.2 | 71.8 | 111 | 101 | 89.8 | 175 | 145 | 358 |
| Viscosity Index | 112 | 124 | 79 | 101 | 86 | 48 | 95 | 51 | 112 |
| Viscosity (cs.): | | | | | | | | | |
| 100° F | 15.2 | 63.0 | 166 | 302 | 304 | 340 | 704 | 835 | 1,378 |
| 210° F | 3.37 | 9.12 | 13.4 | 23.0 | 20.7 | 18.0 | 37.3 | 30.7 | 77.0 |
| Wear (mm.): | | | | | | | | | |
| Steel on Steel (10 kg.) | 0.57 | 0.54 | 0.52 | 0.51 | | | 0.44 | | |
| Steel on Steel (20 kg.) | | 0.60 | 0.47 | 0.52 | | | | | |
| Steel on Bronze (10 kg.) | 1.22 | 1.57 | 1.55 | 0.86 | | | 0.54 | | |

5% of didodecyl selenide and 0.05% of quinizarin. Test oil IV-86 was composed of 71.59% of the 330–340 alkylbenzene mixture, 18% of the poly (α-methylstyrene), 5% of the styrene-olefin copolymer, 5% of the didodecyl selenide and 0.05% quinizarin. The data are given in following Table IV.

*Table IV*

| Test No. | Fluid | Viscosities (cs.) | | | | | | | |
|---|---|---|---|---|---|---|---|---|---|
| | | Before irradiation | | After Radiation to— | | | | | |
| | | | | 5×10⁸ R | | 10⁹ R | | 5×10⁹ R | |
| | | 100° F. | 210° F. | 100° F. | 210° F. | 100° F. | 210° F. | 100° F. | 210° F. |
| 81 | IV-81 | 26.01 | 4.935 | 21.29 | 3.86 | 20.12 / 20.19 / 22.24 / 21.46 | 3.69 / 3.74 / 3.80 / 3.71 | | |
| 82 | III-74 | 25.72 | 4.43 | 20.33 | 3.51 | | | 72.22 | 7.09 |
| 83 | IV-83 | 315.1 | 18.61 | 223.2 | 12.77 | 245.2 | 13.43 | 7,823 | 69.7 |
| 84 | III-78 | 366.3 | 17.17 | 201.5 | 10.92 | 197.9 | 11.02 | 1,155 | 31.1 |
| 85 | III-79 | 327.9 | 17.36 | 189.1 | 11.43 | 180.5 | 11.02 | 391.7 | 16.41 |
| 86 | IV-86 | 105.6 | 9.44 | 88.82 | 7.83 | 107.9 | 8.48 | 10,341 | 117.3 |
| 87 | III-76 | 107.6 | 9.26 | 75.55 | 6.96 | 84.86 | 7.58 | 764.7 | 26.7 |

EXAMPLE V

A series of fluids of varying viscosities were prepared from base oils A and F, heretofore described, and base oil G which was an alkylbenezene mixture similar to base oil F but with an average molecular weight of about 380. All the base oils were combined with 5% didodecyl selenide and 0.05% quinizarin. To these base oils were added varying amounts of the poly (α-methylstyrene) and styrene-olefin copolymer heretofore described. As indicated below, a petroleum bright stock having a viscosity of 210 SSU at 210° F. was used in one fluid and the vinyl butyl ether resin, described hereinbefore. The

EXAMPLE VI

For comparison with the results in Table V, the following wear data were obtained on conventional materials; silicone 200 is the polymethyl silicone marketed by Dow Corning as D.C. Silicone 200.

*Table VI*

| Material | Wear Scar (mm.) | | |
|---|---|---|---|
| | Steel on Steel | | Steel on Bronze |
| | 10 kg. | 20 kg. | 10 kg. |
| SAE 30 Motor Oil | 0.24 | 0.30 | 1.20 |
| SAE Gear Oil 90 | 0.34 | | 0.87 |
| Silicone 200 | 0.44 | | 0.68 |

EXAMPLE VII

The test oils set forth in Table V above and hereinafter identified as test oil V-88, etc., were subjected at 25° C. to gamma radiation as indicated below, at various dosages in Pyrex glass containers open to the air and in closed magnesium containers under one atmosphere of helium, substantially air-free. The fluids in glass containers (tests 97–104) were exposed to the source used in Example I and the samples in the magnesium containers (tests 105–114) were exposed to the source used in Example IV. The fluid identified as VII–114 was composed of 30% of the poly (α-methylstyrene) and the remainder a eutectic of about 23% biphenyl and 77% diphenyl oxide, marketed as "Dowtherm A" by Dow Chemical Co. The results are given in the following Table VII.

quinizarin and the remainder the 330–340 molecular weight mixed alkylbenzenes of base oil F used in Example III there were added various gelling agents to form grease compositions. The following Table VIII shows the amount of gelling agents and other added agents in the final composition. Therein, the estersil was an hydrophobic finely divided silica obtained from E. I. Du Pont de Nemours & Co. under the name "Du Pont Silica GS–199S" (see also Patent 2,752,310, column 2, lines 40–41); the carbon black was "Acetylene Black" from Shawinigan Products Corp.; the graphite was "Acheson-39 Graphite" from Acheson Carbon Company; the molybdenum disulfide was "Molykote" from Alpha Corp., Greenwich, Connecticut; and the lauryl phosphoric acid was a mixture of mono- and di-lauryl phosphoric acids obtained as "Ortholeum-162" from the Du Pont Com-

Table VII

| Test No. | Fluid No. | Dosage (R×10⁸) | Viscosities (cs. at °F.) | | | | | | Viscosity Index | | Gas Formed | | Index of Damage | |
|---|---|---|---|---|---|---|---|---|---|---|---|---|---|---|
| | | | 100° | | 130° | | 210° | | | | | | | |
| | | | Orig. | Irrad. | Orig. | Irrad. | Orig. | Irrad. | Orig. | Irrad. | p.s.i. | ml/ml. oil | $T_{10}$ | $\eta_{10}$ |
| *Irradiated in glass containers, open to air* | | | | | | | | | | | | | | |
| 97 | V-88 | 1.90 | 15.2 | 13.6 | 8.85 | 7.85 | 3.38 | 2.95 | 105 | 64 | | | 123 | 8.8 |
| 98 | V-89 | 1.90 | 63 | 49.9 | 31.4 | 19.0 | 9.13 | 7.2 | 125 | 112 | | | 203 | 7.65 |
| 99 | V-90 | 1.90 | 166 | 143 | 64.4 | 57.5 | 13.5 | 11.3 | 78 | 60 | | | 231 | 8.4 |
| 100 | V-91 | 1.90 | 345 | 235 | 114 | 93 | 23.0 | 17.5 | 91 | 86 | | | 269 | 7.8 |
| 101 | V-92 | 1.90 | 304 | 252 | 109 | 96 | 20.7 | 17.0 | 87 | 73 | | | 261 | 8.4 |
| 102 | V-93 | 1.90 | 340 | 304 | 112 | 105 | 18.0 | 15.7 | 48 | 28 | | | 248 | 8.5 |
| 103 | V-94 | 1.90 | 704 | 562 | 231 | 195 | 37.4 | 28.6 | 95 | 79 | | | 303 | 8.0 |
| 104 | V-95 | 1.90 | 835 | 716 | 234 | 210 | 30.7 | 25.5 | 51 | 28 | | | 280 | 8.3 |
| *Irradiated in magnesium containers, under helium* | | | | | | | | | | | | | | |
| 105 | V-88 | 93 | 15.2 | (¹) | 8.85 | | 3.38 | | 105 | | empty | 38 | 123 | |
| 106 | V-89 | 93 | 63 | ¹ 20.7 | 31.4 | | 9.13 | 40.5 | 125 | 79 | 805 | 38 | 203 | 47 |
| 107 | V-90 | 93 | 166 | ¹ 45.5 | 64.4 | | 13.5 | 109 | 78 | 54 | 495 | 23 | 231 | 60 |
| 108 | V-91 | 93 | 345 | ¹ 62.8 | 114 | | 23.0 | 148 | 91 | 94 | 805 | 38 | 269 | 43 |
| 109 | V-92 | 101 | 304 | ¹ 1,105 | 109 | | 20.7 | | 87 | | high | | 261 | |
| 110 | V-93 | 101 | 340 | ¹ 327 | 112 | | 18.0 | 1,331 | 48 | 65 | high | | 248 | 360 |
| 111 | V-94 | 101 | 704 | ¹ 121 | 231 | | 37.4 | 299 | 95 | 104 | high | | 303 | 48 |
| 112 | V-95 | 101 | 835 | ¹ 207 | 234 | | 30.7 | 398 | 51 | 124 | 699 | 31 | 280 | 138 |
| 113 | V-96 | 99.5 | 1,378 | (¹) | 472 | | 77 | | 113 | | 54 | | solid | |
| 114 | VII-114 | 86 | 32.0 | ¹ 399 | 9.5 | | 1.76 | 6.24 | | 196 | 139 | 6 | 128 | 26 |

¹ Viscosity at 250° F.

The foregoing examples illustrate the improvements obtained in lubricating oils and other fluid compositions in accordance with the present invention. The following examples illustrate grease compositions prepared by incorporating gelling agents in the fluid compositions. Various gelling agents can be employed for this purpose, including metal soaps, e.g., aluminum and sodium soaps; but preferable are materials, such as fumed silica, estersils, graphite and/or mixtures thereof, which have a low cross-section, for slow neutrons and hence do not become excessively radioactive. Other gelling agents are carbon black, organophilic treated bentonites such as marketed by National Lead Co., Baroid Sales Division, as "Bentone 34" (believed to be dimethyl dioctadecyl ammonium bentonite), the various gel-forming finely-divided oxides, e.g., silica aerogels, silica hydrogels, and estersils, as described in Patents 2,711,393; 2,583,604; 2,260,625; 2,676,148, and 2,746,922. The gelling agents and combinations thereof are used in amounts sufficient to thicken the liquid mixture to a grease consistency. Normally such amounts range from 1–20% of the final grease or thickened oil compositions.

EXAMPLE VIII

To portions of fluid composition of 10% poly(α-methyl styrene), 2.5% styrene-olefin copolymer (both described in earlier examples), 5% didodecyl selenide, 0.1% quinizarin and the remainder the 330–340 molecular pany. The term "estersil" as employed herein is conventionally employed in the art to indicate "a fine, free-flowing, hydrophobic silica powder obtained by esterification of free silanol groups (—SiOH) on the surface of the silica particles with a monohydric alcohol" (pp. 441, The Condensed Chemical Dictionary, Reinhold Publishing Co.). The "NLGI Grade No." is the classification adopted on October 2, 1939, by the National Lubricating Grease Institute to indicate grease consistency, as determined by ASTM worked penetration. The penetrations and dropping points are determined by ASTM Test Designation D217–52T and D566–42, respectively.

The Navy gear wear test is carried out with small spiral bevel gears of brass and of steel with pitch diameters of 0.359 and 0.4769 inch, respectively, run together under a prescribed load. The power source delivers a sinusoidal reciprocating motion of 3.14 amplitude at 50 cycles per minute. The gears are run in on di(2-ethylhexyl) sebacate for 1500 cycles under a five-pound load. After this time the weight loss must not have exceeded 2.0 mg. per 1000 cycles. The gears are then operated for 6000 cycles on the test lubricant at five-pound load followed by an additional 3000 cycles at a ten-pound load. The load is applied in torsion so that the gears are loaded against the helix. The gears are cleaned and weighed at each test interval. The criterion of the test is the weight loss of the brass gear to the nearest 0.1 mg. per 1000 cycles.

The four ball wear test was carried out as indicated in Example V but with the rotational speeds and jaw loads indicated below.

*Table VIII*

| Added Agents, percent by Weight | Test Nos. | | | | | | | | |
|---|---|---|---|---|---|---|---|---|---|
| | 115 | 116 | 117 | 118 | 119 | 120 | 121 | 122 | 123 |
| Estersil | 14 | 17.5 | 13 | | | | 12 | 16 | 18 |
| Lithium hydroxystearate | | | | 8.4 | | | | | |
| Carbon Black | | | | | 15 | 12.2 | | | |
| Graphite | | | 5 | | | | | | |
| Molybdenum disulfide | | | 2 | | | | | | |
| Lauryl phosphoric acid | | 0.5 | | | | | | | |
| NLGI Grade | 2 | 2 | 2 | 2 | 2 | 1 | 0 | 3 | 4 |
| ASTM Worked Penetration | 275 | 288 | .267 | 276 | 286 | 301 | 266 | 233 | 177 |
| ASTM Dropping Point | 500+ | 500+ | 500+ | 500+ | 500+ | 500+ | 500+ | 500+ | 500+ |
| Navy Gear Wear Test: | | | | | | | | | |
| (a) 6,000 cycles at 5 lbs., mg./cycle | 0.67 | 0.93 | { 0.27 / 0.22 | | | 1.17 / 1.03 | | | |
| (b) 3,000 cycles at 10 lbs., mg./cycle | 4.6 | 5.8 | { 0.90 / 1.03 | | 1.67 / 8.07 | 3.07 / 27 | | | |
| Four Ball Wear Test: | | | | | | | | | |
| (a) Steel on Bronze, 800 r.p.m. 30 min.; scar diam., mm.— | | | | | | | | | |
| at 2 lb. jaw load | 0.64 | 0.40 | 0.23 | | 0.25 | 0.18 | | | |
| at 5 lb. jaw load | 0.64 | 0.71 | 0.76 | | 0.72 | 0.59 | | | |
| (b) Steel on Steel, 800 r.p.m. 30 min.; scar diam., mm., 20 lb. jaw load | 0.45 | 0.41 | 0.47 | | 0.50 | 0.38 | | | |

EXAMPLE IX

Some of the test greases from Example VIII, identified as test grease VIII-116 (corresponding to test grease 116 of Example VIII), etc., and other grease compositions, described below, were irradiated. In tests 124 and 125, the greases were exposed, at 25° C. in magnesium vessels sealed under helium, to the radiation source described in Example IV. The same source was used to irradiate the greases of tests 126–128, at 25° C. in magnesium vessels open to the air. The greases in tests 129–132 were exposed, at 25° C. in steel vessels open to the air, to the cobalt–60 source described in Example I. The penetration (both before and after irradiation) were calculated from actual penetration obtained with a quarter-size cone. Test grease IX–129 below was composed of 13.9% estersil (as described for Example VIII), 8% iodonaphthalene and the remainder the 250 average molecular weight alkylbenzene mixture used in fluid B of Example II. Test grease IX–130 was composed of 10.9% of aluminum stearate and the remainder the 330–340 average molecular weight alkylbenzenes used in fluid F of Example III. Test grease IX–131 was composed of 13.1% of the same estersil, 8% of iodonaphthalene and the remainder amylbiphenyl. Test grease IX–132 is a commercial aviation grease, NLGI, Grade 2, containing a lithium soap thickener and a mineral oil base.

exposed, at 80° F. in a metal can open to air to $47 \times 10^8$ roentgens from the radiation source described in Example IV. The grease before and after irradiation had the properties shown in following Table X:

*Table X*

| | ASTM Penetration | | ASTM Dropping Point (° F.) |
|---|---|---|---|
| | Unworked | Worked (60 strokes) | |
| Before Irradiation | 199 | 290 | 500+ |
| After Irradiation | 121 | 426 | 500+ |

Although greases generally are extremely sensitive to the action of ionizing radiations, resulting in excessive change in the gel structure and grease consistency, particularly in conventional metallic soap-mineral oil greases at dosages of $5 \times 10^8$ R., the foregoing data illustrate that the special formulations of alkylbenzene base oils with poly(alkylstyrene) are more radiation resistant and show considerably less consistency change.

Although this invention has been described with particular emphasis upon the currently important application to nuclear power plant services, it is inherently of much wider applicability. In pursuits other than power genera-

*Table IX*

| Test No. | 124 | 125 | 126 | 127 | 128 | 129 | 130 | 131 | 132 |
|---|---|---|---|---|---|---|---|---|---|
| Grease No. | VIII-122 | VIII-117 | VIII-121 | VIII-122 | VIII-116 | IX-129 | IX-130 | IX-131 | IX-132 |
| ASTM worked Penetration at Dosage of $R \times 10^8$: | | | | | | | | | |
| None | 233 | 290 | 366 | 233 | 307 | 246 / 160 | 211 / 281 | 97 / 140 | 288 / 340 |
| 5.1 | | | | | | | | | |
| 50.5 | | 397 | | | | | | | |
| 51.8 | | | | | | 363 | | | |
| 57.5 | 393 | | | | | | | | |
| 61.5 | | | 388 | 355 | | | | | |
| ASTM Dropping Point at Dosage of $R \times 10^8$: | | | | | | | | | |
| None | 500+ | 500+ | 500+ | | | 500+ / 500+ | 456 / 262 | 500 / 500 | 428 / 378 |
| 5.1 | | | | | | | | | |

EXAMPLE X

Another grease composition was formulated with 70.8% of the 330–340 average molecular weight alkylbenzenes used in fluid F of Example III, 8.5% of the same estersil used in Example VIII, 2.2 of the poly(alpha-methyl-styrene), 4.3% of the didodecyl selenide dibenzothiophene and 0.1 of quinizarin. This composition was tion, where such organic fluids are unprotectedly disposed in the proximity of neutronic reactors, the instant invention may likewise afford beneficial results. Moreover, aside from neutronic reactors, this procedure may be applied to resist damage from the same types of deleterious radiation, especially neutrons and gamma rays, emitted from other conventional radiation sources of same, such as radium-beryllium neutron sources, and nuclear reactions effected by means of Van de Graaff-generator-energized linear accelerators, and cyclotrons, and the like. Various additional applications of the hereinbefore-disclosed method will become apparent to those skilled in the art. It is therefore to be understood that all matters contained in the above description and examples are illustrative only and do not limit the scope of the present invention.

We claim:

1. A nuclear radiation-resistant composition which is predominately a mixture of a base oil which is adversely affected by nuclear radiations selected from the group consisting of long-chain paraffinic hydrocarbons, long-chain paraffin substituted aromatic hydrocarbons, organic esters and polyethers and a radiation-resistant, liquid polymer of an alpha methyl styrene which polymer is soluble in said base oil and more viscous than said base oil, said mixture being composed of 1–70% of said polymer and the remainder said base oil.

2. The composition of claim 1 wherein said base oil consists of alkylbenzenes having an average molecular weight of 200 to 350.

3. The composition of claim 1 wherein said base oil consists of organic esters of dicarboxylic acids and aliphatic alcohols having about 6 to 12 carbon atoms in the molecule.

4. The composition of claim 1 which contains as an oxidation inhibitor an organic selenide.

5. A nuclear radiation-resistant liquid lubricant whose viscosity does not change substantially with continued exposure to nuclear radiation, which composition consists essentially of a mixture of a radiation-unstable oil of lubricating viscosity and selected from the group consisting of long-chain paraffinic hydrocarbons, long-chain paraffin substituted aromatic hydrocarbons, organic esters and polyethers and an oil-soluble radiation-resistant liquid polymer of alpha methyl styrene, said mixture being composed of 1–70% of said polymer and the remainder said oil of lubricating viscosity, and a minor portion of a viscosity index improving acrylate ester polymer, which tends to decrease in viscosity upon exposure to nuclear radiation, said acrylate ester polymer being present in such amount to offset a substantial part of the viscosity increase of the lubricant due to the tendency of said mixture of base oil and styrene polymer to increase in viscosity upon exposure to a nuclear radiation.

6. A liquid lubricant having a substantially reduced viscosity change in the presence of nuclear radiation said lubricant consisting essentially of a mixture of alkylbenzenes and an α-methyl styrene polymer which is soluble in, and more viscous than, said alkylbenzenes, said mixture of alkylbenzenes and methyl styrene polymer being composed of 1–17% of said polymer and the remainder of said alkylbenzenes, said mixture being in major proportion and tending to increase in viscosity upon exposure to nuclear radiation, and a viscosity index improving styrene-3 to 4 carbon atom olefin copolymer which tends to decrease in viscosity upon exposure to nuclear radiation, said copolymer being present in a small amount sufficient to offset the viscosity increase of the lubricant due to the tendency of said mixture to increase in viscosity upon exposure to nuclear radiation.

7. The improved method for the lubrication of a system being subjected to nuclear radiation, which comprises lubricating said system with a radiation-resistant liquid composed predominantly of a mixture of a lubricating oil selected from the group consisting of long-chain paraffinic hydrocarbons, long-chain paraffin substituted aromatic hydrocarbons, organic esters and polyethers which substantially increase in viscosity upon exposure to nuclear radiations and an oil-soluble radiation-resistant, liquid polymer of alpha-methyl styrene in an amount sufficient to inhibit said viscosity increase of the lubricating oil.

8. A radiation-resistant lubricating grease composition composed predominately of liquid mixture of a base oil selected from the group consisting of long-chain paraffinic hydrocarbons, long-chain paraffin substituted aromatic hydrocarbons, organic esters and polyethers and an oil-soluble, radiation-resistant, liquid polymer of alpha-methyl styrene, said mixture being composed of 1–70% of said polymer and the remainder of said base oil, and a small amount, sufficient to thicken substantially said liquid mixture to a grease consistency, of a gel-forming finely-divided silica.

9. The lubricating grease composition of claim 8 wherein the gelling agent is an estersil.

10. The lubricating grease composition of claim 8, wherein the base oil is alkylbenzene of an average molecular weight from 200–350.

11. The lubricating grease composition of claim 8, to which has been added a small amount of an iodo-substituted aromatic compound.

12. A liquid lubricant with a substantially reduced tendency to viscosity change in the presence of nuclear radiation, said lubricant consisting essentially of a major proportion of a mixture composed of a hydrocarbon lubricating oil and 1–70% of an oil-soluble liquid α-methyl styrene polymer, said mixture tending to increase in viscosity upon exposure to nuclear radiation, and a minor proportion of a viscosity index improving olefin polymer produced from olefins having chain lengths of 3 to 4 carbon atoms and which tends to decrease in viscosity upon exposure to nuclear radiation, said olefin polymer being present in a small amount sufficient to offset the viscosity increase of the lubricant due to the tendency of said mixture to increase in viscosity upon exposure to nuclear radiation.

References Cited in the file of this patent

UNITED STATES PATENTS

| | | |
|---|---|---|
| 2,572,558 | Butler | Oct. 23, 1951 |
| 2,583,603 | Sirianni et al. | Jan. 29, 1952 |
| 2,583,604 | Sirianni et al. | Jan. 29, 1952 |
| 2,661,335 | Butler | Dec. 1, 1953 |
| 2,666,744 | Dixon | Jan. 19, 1954 |
| 2,672,447 | Stewart et al. | Mar. 16, 1954 |
| 2,752,310 | Blattenberger | June 26, 1956 |
| 2,766,205 | Marshall et al. | Oct. 9, 1956 |
| 2,786,032 | Hollyday et al. | Mar. 19, 1957 |

OTHER REFERENCES

Wall: "Effects of Atomic Radiation on Polymers," Modern Plastics, July 1953, vol. 30, No. 11, pages 111, 112, 114, 116.

Charlesby: "How Radiation Affects Long-Chain Polymers," Nucleonics, June 1954, vol. 12, No. 6.

Mincher: "Radiation Damage to Various Non-Metallic Materials," A.E.C. Kapl-731, April 2, 1952; declassified February 15, 1955; pages 3–8, 12, 15, 16, 19 and 48. Knolls Atomic Power Lab., G.E. Co., Schenectady, N.Y.